US008484174B2

(12) United States Patent
Shukla et al.

(10) Patent No.: US 8,484,174 B2
(45) Date of Patent: Jul. 9, 2013

(54) COMPUTING ENVIRONMENT REPRESENTATION

(75) Inventors: Dharma Shukla, Sammamish, WA (US); Ori Amiga, Seattle, WA (US); Vijayendra Vasu, Hyderabad (IN); Junfeng Zhang, Albany, CA (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 12/052,554

(22) Filed: Mar. 20, 2008

(65) Prior Publication Data

US 2009/0240728 A1     Sep. 24, 2009

(51) Int. Cl.
*G06F 17/00* (2006.01)

(52) U.S. Cl.
USPC ............ 707/696; 707/651; 707/778; 707/786

(58) Field of Classification Search
USPC ................... 707/999.104, 999.105, 999.106, 707/999.101, 999.102
See application file for complete search history.

(56) References Cited

U.S. PATENT DOCUMENTS

| | | | |
|---|---|---|---|
| 5,437,025 A | 7/1995 | Bale et al. | |
| 5,504,852 A | 4/1996 | Thompson-Rohrlich | |
| 5,548,726 A | 8/1996 | Pettus | |
| 5,850,090 A | 12/1998 | Oashi et al. | |
| 5,930,156 A | 7/1999 | Kennedy | |
| 6,105,062 A | 8/2000 | Andrews et al. | |
| 6,137,493 A * | 10/2000 | Kamimura et al. | 345/423 |
| 6,209,029 B1 | 3/2001 | Epstein et al. | |
| 6,243,746 B1 | 6/2001 | Sondur et al. | |
| 6,330,717 B1 | 12/2001 | Raverdy et al. | |
| 6,374,252 B1 | 4/2002 | Althoff et al. | |
| 6,546,554 B1 | 4/2003 | Schmidt et al. | |
| 6,573,907 B1 | 6/2003 | Madrane | |
| 6,594,664 B1 | 7/2003 | Estrada et al. | |
| 6,662,192 B1 | 12/2003 | Rebane | |
| 6,678,724 B2 | 1/2004 | Nakajima et al. | |
| 6,685,090 B2 | 2/2004 | Nishigaya et al. | |

(Continued)

FOREIGN PATENT DOCUMENTS

| | | |
|---|---|---|
| CN | 1599901 | 3/2005 |
| CN | 1801086 A | 7/2006 |

(Continued)

OTHER PUBLICATIONS

Miller, "PCI Express and Advanced Switching: Data Movement Protocols", COTS Journal, Dated: Oct. 2003, pp. 76-79.

(Continued)

*Primary Examiner* — Pierre Vital
*Assistant Examiner* — Mohammad S Rostami
(74) *Attorney, Agent, or Firm* — Microsoft Corporation

(57) ABSTRACT

A computing environment may be represented as a deployable object hierarchy, which may be organized according to an object hierarchy schema that is commonly shared among the computing environment host and the devices that are configured to render the computing environment. A particular object hierarchy schema is presented in detail for representing a computing environment, wherein many objects of the computing environment are modeled as resources that may be distinctly addressable (e.g., in a RESTful object hierarchy.) Many types of objects and properties thereof are presented in order to elucidate an exemplary object hierarchy schema and to illustrate exemplary objects and object hierarchies organized according thereto. Additional properties of various object hierarchy schemas include extensibility, deployability, and object addressing models with various advantages.

16 Claims, 9 Drawing Sheets

U.S. PATENT DOCUMENTS

| | | | |
|---|---|---|---|
| 6,732,172 B1 | 5/2004 | House et al. | |
| 6,907,451 B1 | 6/2005 | Mukundan et al. | |
| 6,941,306 B2 | 9/2005 | Kim | |
| 6,952,714 B2 | 10/2005 | Peart | |
| 6,968,535 B2 | 11/2005 | Stelting et al. | |
| 7,013,340 B1 | 3/2006 | Burd et al. | |
| 7,054,927 B2 | 5/2006 | Ulrich et al. | |
| 7,088,995 B2 | 8/2006 | Rao | |
| 7,089,295 B2 | 8/2006 | Chrisfort et al. | |
| 7,099,888 B2 | 8/2006 | Gollapudi et al. | |
| 7,117,243 B2 | 10/2006 | Peart | |
| 7,146,524 B2 | 12/2006 | Patel et al. | |
| 7,149,959 B1 | 12/2006 | Jones et al. | |
| 7,203,485 B2 | 4/2007 | Coppinger et al. | |
| 7,240,327 B2 | 7/2007 | Singh et al. | |
| 7,266,370 B2 | 9/2007 | Paddon et al. | |
| 7,266,563 B2 | 9/2007 | Morris et al. | |
| 7,284,196 B2 | 10/2007 | Skeen et al. | |
| 7,330,872 B2 | 2/2008 | Peart et al. | |
| 7,406,542 B2 | 7/2008 | Erlingsson | |
| 7,483,978 B2 | 1/2009 | Esfahany et al. | |
| 7,577,681 B1 * | 8/2009 | Rozenman et al. | 1/1 |
| 7,836,458 B1 | 11/2010 | Gwozdz et al. | |
| 7,890,543 B2 | 2/2011 | Hunt et al. | |
| 8,185,891 B2 | 5/2012 | DeHaan | |
| 8,290,762 B2 | 10/2012 | Kodosky et al. | |
| 2001/0044801 A1 | 11/2001 | Senn et al. | |
| 2002/0010807 A1 | 1/2002 | Multer et al. | |
| 2002/0029227 A1 | 3/2002 | Multer et al. | |
| 2002/0040368 A1 | 4/2002 | Schreiber | |
| 2002/0103811 A1 | 8/2002 | Fankhauser et al. | |
| 2002/0133669 A1 | 9/2002 | Devireddy et al. | |
| 2002/0138617 A1 | 9/2002 | Christfort et al. | |
| 2003/0004746 A1 | 1/2003 | Kheirolomoom et al. | |
| 2003/0033308 A1 | 2/2003 | Patel et al. | |
| 2003/0063134 A1 | 4/2003 | Lord et al. | |
| 2003/0074393 A1 | 4/2003 | Peart | |
| 2003/0177121 A1 | 9/2003 | Moona et al. | |
| 2003/0233376 A1 | 12/2003 | Bussler et al. | |
| 2004/0006566 A1 | 1/2004 | Taylor et al. | |
| 2004/0031029 A1 | 2/2004 | Lee et al. | |
| 2004/0085947 A1 | 5/2004 | Ekberg et al. | |
| 2004/0103071 A1 | 5/2004 | Kalia et al. | |
| 2004/0111515 A1 | 6/2004 | Manion et al. | |
| 2004/0133589 A1 | 7/2004 | Kiessig et al. | |
| 2004/0148525 A1 | 7/2004 | Aida et al. | |
| 2004/0153568 A1 * | 8/2004 | Ho et al. | 709/238 |
| 2004/0199572 A1 | 10/2004 | Hunt et al. | |
| 2004/0201604 A1 | 10/2004 | Kraenzel et al. | |
| 2004/0236801 A1 | 11/2004 | Borden et al. | |
| 2005/0004978 A1 | 1/2005 | Reed et al. | |
| 2005/0004985 A1 | 1/2005 | Stochosky | |
| 2005/0021847 A1 | 1/2005 | Rothman et al. | |
| 2005/0060315 A1 | 3/2005 | Sanin | |
| 2005/0060581 A1 | 3/2005 | Chebolu et al. | |
| 2005/0062581 A1 | 3/2005 | Koyama | |
| 2005/0091575 A1 | 4/2005 | Relyea et al. | |
| 2005/0102678 A1 | 5/2005 | Hunt et al. | |
| 2005/0125771 A1 | 6/2005 | Vitanov et al. | |
| 2005/0138156 A1 | 6/2005 | Gebhart et al. | |
| 2005/0177600 A1 | 8/2005 | Eilam et al. | |
| 2005/0192962 A1 | 9/2005 | Furrer et al. | |
| 2005/0203931 A1 | 9/2005 | Pingree et al. | |
| 2005/0251786 A1 | 11/2005 | Citron et al. | |
| 2005/0251812 A1 | 11/2005 | Hayward | |
| 2005/0289454 A1 | 12/2005 | Donelson et al. | |
| 2006/0015538 A1 | 1/2006 | LeTourneau | |
| 2006/0015936 A1 | 1/2006 | Illowsky et al. | |
| 2006/0036602 A1 | 2/2006 | Unangst et al. | |
| 2006/0037007 A1 | 2/2006 | Snyder et al. | |
| 2006/0080353 A1 | 4/2006 | Miloushev et al. | |
| 2006/0117073 A1 | 6/2006 | Bosworth et al. | |
| 2006/0123010 A1 | 6/2006 | Landry et al. | |
| 2006/0129972 A1 | 6/2006 | Tyburski et al. | |
| 2006/0130050 A1 | 6/2006 | Betts et al. | |
| 2006/0143435 A1 | 6/2006 | Kwon | |
| 2006/0143601 A1 | 6/2006 | Concha et al. | |
| 2006/0206533 A1 | 9/2006 | MacLaurin et al. | |
| 2006/0253849 A1 | 11/2006 | Avram et al. | |
| 2007/0005613 A1 | 1/2007 | Singh et al. | |
| 2007/0028175 A1 | 2/2007 | Moore et al. | |
| 2007/0038642 A1 | 2/2007 | Durgin et al. | |
| 2007/0061349 A1 | 3/2007 | Morgan et al. | |
| 2007/0073770 A1 | 3/2007 | Morris et al. | |
| 2007/0100834 A1 | 5/2007 | Landry et al. | |
| 2007/0106650 A1 | 5/2007 | Moore | |
| 2007/0118560 A1 | 5/2007 | Bornhoevd et al. | |
| 2007/0150480 A1 | 6/2007 | Hwang et al. | |
| 2007/0169049 A1 | 7/2007 | Gingell et al. | |
| 2007/0180043 A1 | 8/2007 | Vernal et al. | |
| 2007/0209066 A1 | 9/2007 | Timmerman | |
| 2007/0266136 A1 * | 11/2007 | Esfahany et al. | 709/223 |
| 2007/0280165 A1 * | 12/2007 | Doshi et al. | 370/331 |
| 2007/0294366 A1 | 12/2007 | Ozzie et al. | |
| 2008/0016505 A1 | 1/2008 | Bucklew et al. | |
| 2008/0040511 A1 | 2/2008 | Messer et al. | |
| 2008/0057992 A1 | 3/2008 | Griffin | |
| 2008/0059912 A1 * | 3/2008 | Scherpa et al. | 715/853 |
| 2008/0092109 A1 * | 4/2008 | Kinnucan et al. | 717/105 |
| 2008/0130639 A1 | 6/2008 | Costa-Requena et al. | |
| 2008/0155523 A1 | 6/2008 | Kornmann | |
| 2008/0201453 A1 | 8/2008 | Assenmacher | |
| 2008/0249994 A1 * | 10/2008 | Passmore | 707/3 |
| 2008/0276181 A1 | 11/2008 | Moromisato et al. | |
| 2009/0083425 A1 * | 3/2009 | Bozak et al. | 709/226 |
| 2009/0164987 A1 | 6/2009 | Scholz et al. | |
| 2009/0240698 A1 | 9/2009 | Shukla et al. | |
| 2009/0240935 A1 | 9/2009 | Shukla | |

FOREIGN PATENT DOCUMENTS

| | | |
|---|---|---|
| JP | 2002229902 A | 8/2002 |
| WO | 2005072114 A2 | 8/2005 |
| WO | 2005072114 A2 | 11/2005 |
| WO | 2007082005 A2 | 7/2007 |
| WO | WO 2007/083299 A2 | 7/2007 |
| WO | 2008/018051 A2 | 2/2008 |

OTHER PUBLICATIONS

"Synchronizing Data between WinFS Stores", http://blogs.msdn.com/winfs/archive/2006/01/25/517674.aspx.

Foley, "Can Microsoft's 'Harmonica' create P2P harmony across all devices?", Dated: Dec. 18, 2006, pp. 1-2, http://blogs.zdnet.com/microsoft/?p=157.

Vaas, "Microsoft Aims to Mesh Disparate Calendars, Contacts", Dated: Nov. 21, 2005, pp. 1-4, http://www.eweek.com/c/a/Messaging-and-Collaboration/Microsoft-Aims-to-Mesh-Disparate-Calendars-Contacts/.

U.S. Appl. No. 12/052,534, filed Mar. 20, 2008, Shukla, Entire Document.

U.S. Appl. No. 12/052,550, filed Mar. 20, 2008, Amiga et al., Entire Document.

U.S. Appl. No. 12/052,556, filed Mar. 20, 2008, Shukla et al., Entire Document.

Amazon Simple Storage Service (Amazon S3), http://www.amazon.com/gp/browse.html?node=16427261.

Bickmore et al., Digestor: Device-independent Access to the World Wide Web:, Computer Networks and ISDM Systems, vol. 29, Issue 8-13 (Sep. 1997), Year of Publication: 1997, pp. 1075-1082.

Chen et al., "Providing Web Services to Mobile Users: the Architecture Design of an M-Service Portal", International Journal of Mobile Communications 2005—Vo. 3, No. 1, pp. 1-18.

"Google Data APIs Overview", http://code.google.com/apis/gdata/overview.html.

Gribble et al., "The Ninja Architecture for Robust Internet-Scale Systems and Services", Computer Networks: The International Journal of Computer and Telecommunications Networking, vol. 35, No. 4, Dated: Mar. 2001, pp. 473-497.

Han et al., "WebSplitter: A Unified XML Framework for Multi-Device Collaborative Web Browsing", Computer Supported Cooperative Work, Proceedings of the 2002 ACM conference on Computer supported cooperative work, US, Year of Publication: 2000, pp. 221-230.

Hejtmanek, "Distributed Data Storage Based on Web Access and IBP Infrastructure", In Data Processing and Storage Networking: Towards Grid Computing, Technical Proceedings. : The Third IFIP-TC6 Networking Conference, 2004, Athens, Greece, Dated: May 14, 2004, pp. 1-8.

Mukhi et al., "Multi-Protocol Web Services for Enterprises and the Grid", Proc. of EuroWeb 2002 Conference: The Web and the Grid: From e-science to e-business, Oxford, UK Dated: Dec. 2002, pp. 1-10.

Sollins et al. "Linking in a Global Information Architecture", pp. 1-18, http://www.ana.ics.mit.edu/people/sollins/links.html.

Verisign "VeriSign Unified Authentication Service", pp. 1-3.

International Search Report from related PCT Application No. PCT/US2009/034601 dated Aug. 24, 2009.

International Search Report from related PCT Application No. PCT/US2009/035602 dated Oct. 1, 2009.

Nathan et al., "Convert XML to JSON in PHP", dated: Jan. 16, 2007, pp. 1-10, http://www.ibm.com/developerworks/xml/library/x-xml2jsonphp/.

"Mapping Between JSON and XML", http://msdn2.microsoft.com/en-us/library/bb924435.aspx.

International Search Report from related PCT Application No. PCT/US2008/062191 dated Oct. 21, 2008.

Communication from related EP Application No. 08747323.7-1225 dated Dec. 14, 2009.

Non-Final Office Action cited in related U.S. Appl. No. 11/744,777 dated Mar. 10, 2010.

"International Search Report", Flied Date Feb. 19, 2009, Application No. PCT/US2009/034442, pp. 1-11.

Non-Final Office Action cited in related U.S. Appl. No. 12/057,000 dated Aug. 4, 2010.

"Grid Metadata Catalog Service-Based OGC Web Registry Service", Peisheng Zhao, Aijun Chen, Yang Liu, Liping Di, Wenli Yang and Peichuan Li, Proceedings of the 12th Annual ACM International Workshop on Geographic Information Systems, 2004, 9 pgs.

"MobiShare: Sharing Context-Dependent Data & Services from Mobile Sources", Efstratios Valavanis, Christopher Ververidis, Michalis Vazirgianis, George C. Polyzos and Kjetil Nørvåg, Proceedings of the IEEE/WIC International Conference on Web Intelligence, 2003, 8 pgs.

"Grid Enabled Relational Database Middleware", Wolfgang Hoschek and Gavin McCance, Informational Document, Global Grid Forum, Oct. 2001, 6 pgs.

Restriction/Election Office Action cited in related U.S. Appl. No. 11/744,777 dated Dec. 1, 2009.

Notice of Allowance cited in related U.S. Appl. No. 11/744,777 dated Aug. 17, 2010.

Reply to Non-Final Office Action cited in U.S. Appl. No. 11/744,777 dated Jun. 10, 2010, 15 pgs.

Reply to Restriction/Election Office Action cited in U.S. Appl. No. 11/744,777 dated Dec. 22, 2009, 10 pgs.

Non-Final Office Action cited in U.S. Appl. No. 12/052,534 dated May 25, 2011, 32 pgs.

Reply to Non-Final Office Action cited in U.S. Appl. No. 12/052,534 dated Jun. 30, 2011, 23 pgs.

Final Office Action cited in U.S. Appl. No. 12/052,534 dated Aug. 16, 2011, 20 pgs.

Reply to Final Office Action cited in U.S. Appl. No. 12/052,534 dated Nov. 16, 2011, 18 pgs.

Non-Final Office Action cited in U.S. Appl. No. 12/052,550 dated Aug. 8, 2011, 21 pgs.

Reply to Non-Final Office Action cited in U.S. Appl. No. 12/052,550 dated Nov. 8, 2011, 18 pgs.

Final Office Action cited in U.S. Appl. No. 12/052,550 dated Mar. 2, 2012, 30 pgs.

Reply to Final Office Action cited in U.S. Appl. No. 12/052,550 dated Sep. 4, 2012, 22 pgs.

Non-Final Office Action cited in U.S. Appl. No. 12/052,556 dated Feb. 17, 2011, 23 pgs.

Reply to Non-Final Office Action cited in U.S. Appl. No. 12/052,556 dated May 16, 2011, 21 pgs.

Final Office Action cited in U.S. Appl. No. 12/052,556 dated Aug. 5, 2011, 23 pgs.

Reply to Final Office Action cited in U.S. Appl. No. 12/052,556 dated Nov. 7, 2011, 22 pgs.

Reply to Non-Final Office Action cited in U.S. Appl. No. 12/057,000 dated Nov. 4, 2010, 19 pgs.

Final Office Action cited in U.S. Appl. No. 12/057,000 dated Jan. 21, 2011, 22 pgs.

Reply to Final Office Action cited in U.S. Appl. No. 12/057,000 dated Mar. 24, 2011, 26 pgs.

Non-Final Office Action cited in U.S. Appl. No. 12/057,000 dated Jul. 5, 2012, 10 pgs.

Reply to Non-Final Office Action cited in U.S. Appl. No. 12/057,000 dated Nov. 5, 2012, 16 pgs.

Non-Final Office Action cited in U.S. Appl. No. 12/910,757 dated Dec. 2, 2011, 18 pgs.

Reply to Non-Final Office Action cited in U.S. Appl. No. 12/910,757 dated Feb. 27, 2012, 12 pgs.

Notice of Allowance cited in U.S. Appl. No. 12/910,757 dated Jun. 21, 2012, 32 pgs.

Notice of Allowance cited in U.S. Appl. No. 12/910,757 dated Sep. 26, 2012, 23 pgs.

Int. Preliminary Report on Patentability cited in PCT Application No. PCT/US2009/034442 dated Sep. 21, 2009, 4 pgs.

First Chinese Office Action cited in Chinese Application No. 200980110676.3 dated Jun. 5, 2012, 7 pgs.

Int. Preliminary Report on Patentability cited in PCT Application No. PCT/US2009/034601 dated Sep. 21, 2010, 5 pgs.

First Chinese Office Action cited in Chinese Application No. 200980110662.1 dated Apr. 6, 2012, 6 pgs.

EP Search Report cited in EP Application No. 09723161.7 dated Oct. 4, 2011, 8 pgs.

EP Communication cited in EP Application No. 09723161.7 dated Mar. 8, 2012, 5 pgs.

Int. Preliminary Report on Patentability cited in PCT Application No. PCT/US2009/035602 dated Sep. 28, 2010, 6 pgs.

First Chinese Office Action cited in Chinese Application No. 200980112183.3 dated Apr. 12, 2012, 6 pgs.

Int. Preliminary Report on Patentability cited in PCT Application No. PCT/US2008/062191 dated Nov. 10, 2009, 8 pgs.

First Chinese Office Action cited in Chinese Application No. 200880014431.6 dated Mar. 22, 2011, 10 pgs.

Third Chinese Office Action cited in Chinese Application No. 200880014431.6 dated Jul. 6, 2012, 9 pgs.

Fourth Chinese Office Action cited in Chinese Application No. 200880014431.6 dated Oct. 29, 2012, 9 pgs.

Australian Office Action cited in Australian Application No. 2008247683 dated Mar. 12, 2012, 3 pgs.

Australian Notice of Allowance cited in Australian Application No. 2008247683 dated Apr. 18, 2012, 3 pgs.

Non-Final Office Action cited in U.S. Appl. No. 12/052,550 dated Dec. 21, 2012, 57 pgs.

Non-Final Office Action cited in U.S. Appl. No. 12/057,000 dated Jan. 16, 2013, 13 pgs.

Notice of Allowance cited in U.S. Appl. No. 12/910,757 dated Sep. 26, 2012, 38 pgs.

Reply to first Chinese Office Action cited in Chinese Application No. 20098011676.3 dated Oct. 23, 2012, 28 pgs.

Reply to first Chinese Office Action cited in Chinese Application No. 200980110662.1 dated Aug. 16, 2012, 6 pgs.

Second Chinese Office Action cited in Chinese Application No. 200980110662.1 dated Dec. 18, 2012, 8 pgs.

Reply EP Communication cited in EP Application No. 09723161.7 dated Dec. 23, 2011, 15 pgs.

Reply EP Communication cited in EP Application No. 09723161.7 dated Jul. 6, 2012, 13 pgs.

Reply first Chinese Office Action cited in Chinese Application No. 200980112183.3 dated Aug. 17, 2012, 40 pgs.

Second Chinese Office Action cited in Chinese Application No. 200980112183.3 dated Dec. 18, 2012, 6 pgs.

Reply first Chinese Office Action cited in Chinese Application No. 200880014431.6 dated Jun. 28, 2011, 15 pgs. 6.

Reply to third Chinese Office Action cited in Chinese Application No. 200880014431.6 dated Jul. 29, 2012, 13 pgs.
Reply to fourth Chinese Office Action cited in Chinese Application No. 200880014431.6 dated Nov. 20, 2012, 13 pgs.
Reply to EP Communication cited in Ep Application No. 08747323.7 dated Jan. 22, 2010, 8 pgs.
Reply to Australian Office action cited in Australian Application No. 2008247683 dated Apr. 12, 2012, 18 pgs.
Russian Office Action and Reply cited in Russian Application No. 2009140733 dated May 5, 2012, 1 pg.
Russian Office Action and Reply cited in Russian Application No. 2009140733 dated Aug. 29, 2012, 3 pg.
Russian Notice of Allowance cited in Russian Application No. 2009140733 dated Dec. 20, 2012, 6 pg.
Reply to Non-Final Office Action cited in U.S. Appl. No. 12/052,550 dated Mar. 21, 2013, 18 pgs.
Second Chinese Office Action cited in Chinese Application No. 200980110676.3 dated Mar. 4, 2013, 9 pgs.
Reply second Chinese Office Action cited in Chinese Application No. 200980110662.1 dated Feb. 28, 2013, 6 pgs.
Reply second Chinese Office Action cited in Chinese Application No. 200980112183.3 dated Feb. 18, 2013, 14 pgs.

* cited by examiner

| OBJECT TYPE | ADDITIONAL OBJECT PROPERTIES |
|---|---|
| Mesh | Self Link Object<br>Title Object |
| Resource | Authors Collection<br>Base Address Object<br>Categories Collection<br>Contributors Collection<br>Copyright Object<br>Identification Object<br>Links Collection<br>Self Link Object<br>Summary Object<br>Title Object |
| Core Object | User Data Object |
| Application | Application Identification Object<br>Homepage Location Object<br>Installed Version Object<br>Manifest Location Object<br>Manifest Version Object |
| Data Entry | Parent Identification Object<br>Synchronization Object<br>User Data Object |
| Data Feed | Synchronization Entries Collection<br>Data Feed Type Object |
| Activity | Activity Type Object<br>Maximum Age Object |
| Member | Invitation Acceptance Indicator Object<br>Invitation Expiration Indicator Object<br>Owner Indicator Object<br>Role Type Object |
| Device | Device Type Object<br>Device Online Indicator Object |
| Mapping | Data Feed Mappings Collection |
| Profile | Name Object<br>Email Address Object |
| Resource Collection | Authors Collection<br>Base Address Object<br>Categories Collection<br>Contributors Collection<br>Copyright Object<br>Identification Object<br>Links Collection<br>Self Link Object<br>Summary Object<br>Title Object |
| Role | Creation Permission Indicator Object<br>Deletion Permission Indicator Object<br>Read Permission Indicator Object<br>Update Permission Indicator Object<br>Role Type Object |

FIG. 7

COMPUTING ENVIRONMENT REPRESENTATION

BACKGROUND

Many computing environments comprise a large and diverse set of objects managed by a set of object systems. For example, a computing environment may comprise a set of files managed by a file system, one or more databases managed by a database system, a set of executable binaries representing applications and managed by a assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The organization of objects within a computing system as a disjointed, loosely aggregated set of object systems may create several problems. For example, it may be difficult to present a consistent computing environment to the user through various devices, especially if the devices vary in capabilities (e.g., a high-performance personal workstation, a browser-based public terminal, and a low-performance cellphone device.) As another example, applying services to the objects, such as synchronization and backup, may involve interfacing with each object system to affect the objects managed thereby, and such interfacing may vary among object systems. As a third example, relating a diverse set of objects (such as all of the objects comprising an application) may be difficult due to the incomplete cooperation of the managing object systems.

An alternative technique for representing the objects comprising the computing environment involves organizing the objects in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.)

Presented herein is one such representation, wherein an object hierarchy is structured according to an object hierarchy schema defining a set of various types of resources, such as an application, an activities collection comprising a set of activities, and a user profiles collection comprising a set of user profiles. The organization of the objects according to the object hierarchy schema specified herein may provide some advantages over other representations and organizations of such objects. For instance, the representations of the objects presented herein are amenable to tagging with certain kinds of metadata, and such metadata may be similarly associated with diverse types of objects (such as applications, data files, and devices) to enable domain-specific metadata. The objects arranged as described herein may also facilitate the mapping of various sets of objects on various devices, which may permit desirable adaptations of the computing environment in relation to different users and devices. These and other benefits may be achieved by an object hierarchy schema specified herein, which benefits may be exhibited by the computing environment represented by the object hierarchy and rendered by devices of varying capabilities.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 7 is an illustration of a set of additional object properties that may be associated with object types of an object hierarchy schema.

DETAILED DESCRIPTION

Figure 1:
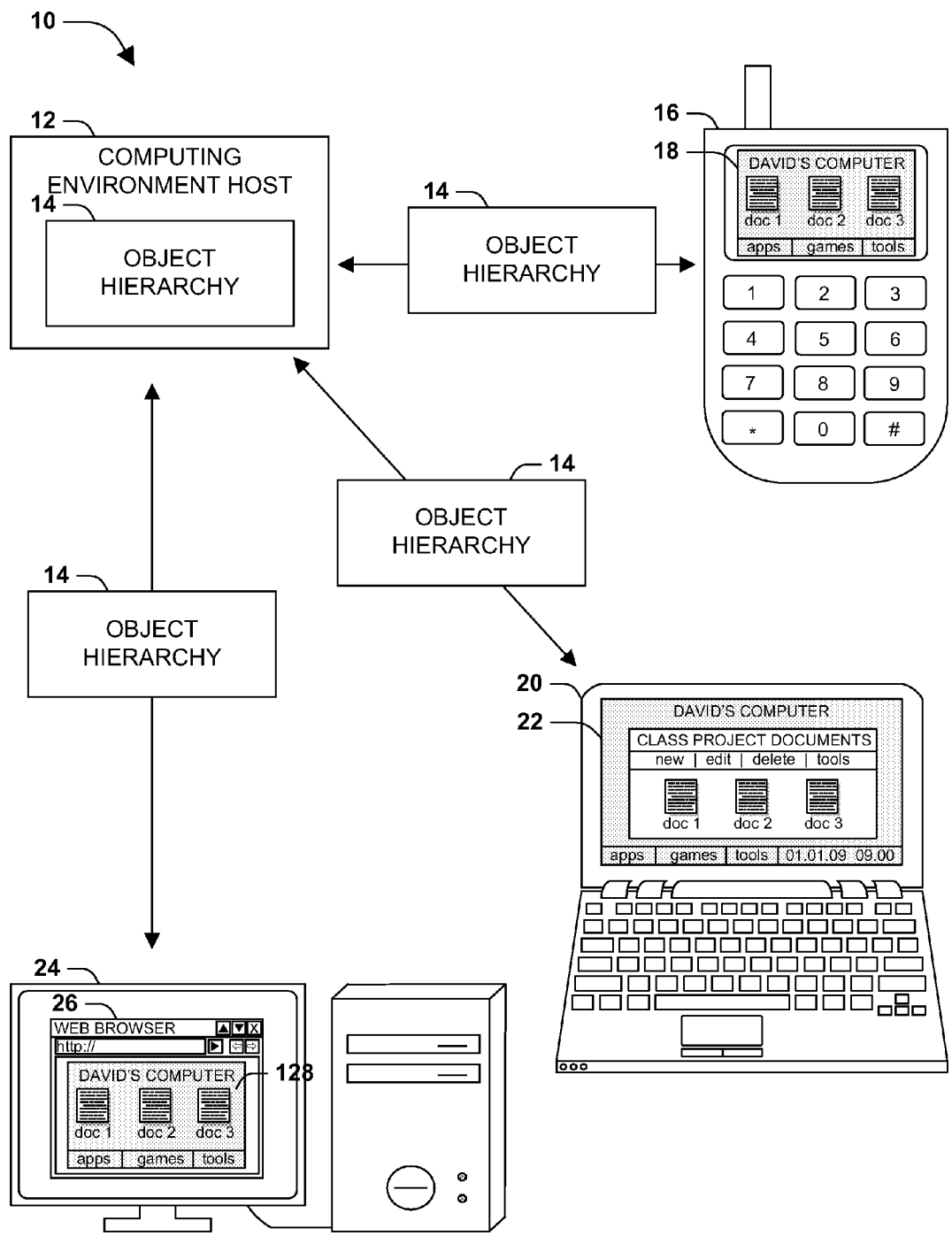
FIG. 1 is an illustration of an exemplary interaction of a computing environment host with various computing environment rendering devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Modern computer systems comprise a large number and variety of objects. Many computer systems feature a file store containing both the files for configuring the computer system (including executables, class libraries, configuration information sets, and resources) and user files generated or received by one or more users. Many computer systems also comprise a wide range of configuration information comprising the computer system hardware and software, including the hardware and devices of the computer system, the operating system, the shell user interface, and the configuration of the applications available within the shell user interface. Various user profiles and accounts may also exist, the former comprising information describing a particular user or user class (name, shell user interface preferences, home directory, etc.), and the latter comprising information describing the privileges of the user or class (file ownership, read/write privileges, access to various devices, etc.) Protected security information, such as passwords, certificates, public/private key pairs, and access control lists, may be stored in a security object, over which the operating system may exert regulated access. One or more data caches may exist, such as browser caches and histories, recent entries in application or browser textboxes, and recently used file and object lists. Various applications may create application- or task-specific archives, such as an email archive containing various folders and messages and a shared address book containing contact information received from various sources by various system users and organized in user-defined groups. Finally, the computer system may be configured to exchange particular sets of information with other computers, users, and devices, such as objects to be synchronized and object sets to which access may be granted with various conditions (read/write privileges, ownership, quotas, etc.) Such object types are typically managed by various management systems (e.g., a file system, a system registry store, a user account management system, and an email system) within the computer system in an ad hoc manner, with little consistency or standardization of access methods or object organization.

The organization of objects within a computing system as a disjointed, loosely aggregated set of object systems may create several problems. As a first example, rendering and maintaining a consistent computing environment comprising a consistent set of objects (such as files, applications, user profiles, application configuration, data caches, etc.) may be very difficult, especially among devices of varying capabilities, such as a personal workstation, a public terminal, and a cellphone device. As a second example, applying services to the objects may be complicated by the storage of diverse objects in multiple object systems. For instance, locating objects matching a particular description (such as objects last modified within a particular time span) may involve querying for matching files through one or more file systems, matching database records through a database system, matching registry keys through a system registry, matching applications through an assembly cache, matching data cache items through various data caches, etc. Because such object systems often store the associated objects in non-standard ways, such as with parameters specific to the nature of the objects (e.g., examining file records through a file system journal, and examining database records through a data-specific timestamp), applying an operation to each the various object systems may be difficult. As a third example, because each object system is configured to manage a particular kind of object, relating and mixing the types of objects may be difficult. For instance, an application may comprise an executable binary stored in an assembly cache, some configuration information stored in a system registry, supplemental files (such as dictionaries for various languages) stored in a file system, and events (such as recently edited documents) stored in data caches. It may be difficult to represent an association of these object types in various systems, and to manipulate all such objects together (e.g., deleting all such objects in order to uninstall the application.) As a fourth example, the object set of the computer system may be distributed across several devices, and providing consistent access to the object sets may be complicated by the various configurations of the devices, the network capabilities of each device, and incompatibilities in the wire formats used by each device for exchanging data (e.g., a first device may be configured to exchange data according to an XML schema, and a second device may be configured to exchange data according to JSON.)

An alternative approach may be devised, wherein the computing environment is represented in a manner that may be delivered to devices for rendering according to the capabilities of the device. The representation comprises a set of objects organized according to an object hierarchy and represented according to a common grammar. The objects include the data objects of the computer system, such as the user files and data created by the user. The objects also include the executable binaries and class libraries comprising the operating system components, such as the shell, and the applications offered therein. The object also include the information specifying the user interface of a computing environment, including shell preferences (e.g., visual themes, application launch menu, and double-click threshold), user accounts and privileges, security information (e.g., passwords, security tokens, and certificates), application binaries and configuration information, user data and metadata (e.g., file sharing information), and data caches (e.g., most-recently-used file lists and browser history.) Despite the various nature and uses of these objects, the objects are represented in a common manner in the object hierarchy, and may be arbitrarily organized in the hierarchy. Thus, in contrast with former systems comprising a set of isolated data stores, each containing one type of object (e.g., a file system containing files, a registry containing configuration information, and a data cache containing the browser history), the object hierarchy in this approach organizes all such objects in a common manner in the object hierarchy.

A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the canonical source of the information set, and thereby propagated to all other devices to which the information set is delivered. Also, the devices sharing the computing environment may be integrated through the shared information set, such that one device may interact with others that are identified in the information set; e.g., data stored on a first device may be accessed by a second device, and a first device may be controlled by a second device through a communications conduit. The information set may therefore identify the collection of devices that share the computing environment, along with the roles, capabilities, and resources of each device, to provide an integrated computing experience across a potentially large number and variety of devices.

FIG. 1 illustrates one such scenario 10, wherein the computing environment may be hosted by a computing environment host 12, which may store and manage an object hierarchy 14. The computing environment host 12 may also render the object hierarchy 14 in different ways on behalf of various devices, such as a cellphone device 16, a personal notebook computer 20, and a public workstation 24, and also on behalf of different types of users having different access privileges. The rendering of the computing environment therefore reflects a consistent computing environment across all devices that expose the same applications, user profiles, shell configuration, user data objects, etc. Thus, a user may access a full-featured version 22 of the computing environment through a high-performance notebook computer, a stripped-down version 18 of the computing environment on a low-power cellphone device 16, and a browser-compatible and privacy-oriented version 28 of the computing environment through a web browser 146 of a public terminal 24. To the extent that the capabilities of each such device support the rendering of the computing environment, a consistent user interface and data set may be presented due to the rendering of the object hierarchy 14 adjusted to the capabilities of each device. Updates to the computing environment may be propagated back to the computing environment host 12, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Moreover, the computing environment host 12 may apply services to the various objects comprising the object hierarchy 14, and the common format in which the objects are stored in the object hierarchy may facilitate consistent availability and application of the services regardless of the nature of the objects applied thereto.

In furtherance of these ends, an object hierarchy schema may be devised for organizing the objects of the object hierarchy in a particular manner. For instance, objects may be devised and structured to represent data objects (such as files), users and user accounts, devices, and events arising with the computing environment, as well as derivation, ownership, and interrelationships therebetween. The manner of organizing the objects may give rise to particular advantages and/or reduce disadvantages with respect to other organizations of the objects. Accordingly, the object hierarchy schema according to which the objects may be organized is devised in view of the uses of such objects and of the computing environment. For instance, security permissions may be modeled by associating respective objects with one or more user accounts having various sets of permissions (e.g., a first user account having read/write permissions to an object, a second user account having read-only permissions to the object, and a third user account having no permissions to the object.) The computing environment may be configured to utilize the objects of an object hierarchy according to the structure and semantics of the object hierarchy schema, thereby enabling the presentation of a deployable computing environment across a plurality of devices in a manner that is appropriate for the configuration and capabilities of each device, but otherwise consistent among all such devices.

It may be appreciated that the formulation of the object hierarchy schema may significantly impact the configuration of the devices and the server hosting the computing environment. As one example, a device may request only a portion of the computing environment (e.g., a cellphone device may request the portion of the object hierarchy containing a set of contact information, such as telephone numbers and email addresses), and the server may provide only that portion; however, if the device and the server are operating on different object hierarchy schemas, the request may fail. For instance, the device might request a particular portion of the object hierarchy (e.g., /Contacts) according to a first object hierarchy schema, but the server may store such information in a different portion of the object hierarchy (e.g., /AddressBook/Contacts) according to a second object hierarchy schema, and may therefore be unable to provide the information requested, even if contact information exists in the object hierarchy hosted by the server. As a second example, the server may be capable of storing object hierarchies according to any object hierarchy schema, but may be more advantageously configured to utilize part of the object hierarchy while providing services thereto, and may therefore expect to find objects defined and organized in the object hierarchy according to a particular object hierarchy schema. For instance, in responding to a request by a device to receive the object hierarchy, the server may attempt to authenticate the device using authentication information stored in the object hierarchy. Thus, the server may be more easily configured to host object hierarchies according to a particular object hierarchy schema, so that it may also access and utilize the information stored within the object hierarchy schema while providing services relating thereto.

In view of the foregoing principles, presented herein is one such object hierarchy schema, wherein the objects are defined and interrelated in a particular manner that facilitates the application of services to the computing environment by the server, and the deployability of the computing environment to devices that may render the computing environment in a consistent but device-specific manner. The object hierarchy schema described herein is presented as a defined set of objects, each definition representing a particular type of data object in the computing environment (e.g., a user profile, an application, and a device) and having certain properties related thereto. Some of the objects are defined as specialized types of other objects, e.g., a generic "person" object type may be extended to represent a "user" object type, which may be a person with additional information representing the privileges of the person in the computing environment. Additionally, some objects are defined as containers for one or more other objects, such as a "people collection" object type that contains one or more "people" object types. Moreover, the object hierarchy schema presented herein defines a hierarchical organization of the objects defined herein within the object hierarchy; i.e., certain object types are to be stored in certain locations of the object hierarchy, so that any device or computer system that searches for such objects within the object hierarchy will find any that exist within the computing environment at a known, established location within the object hierarchy.

Figure 2:
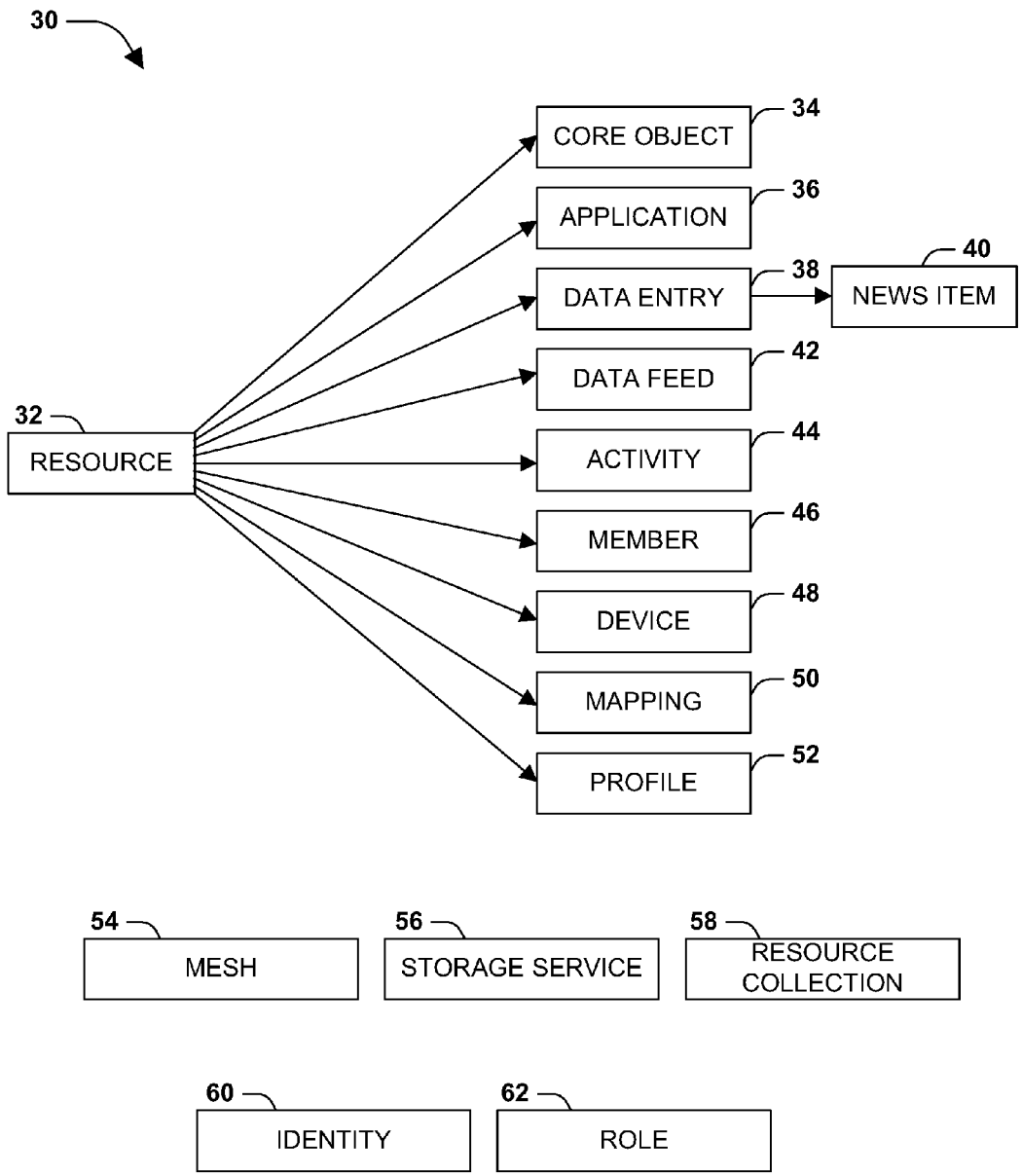
FIG. 2 is an illustration of an exemplary object hierarchy schema object set.

FIG. 2 illustrates the object types of the object hierarchy schema, and the extension interrelationships therebetween. In this figure, the object relationships illustrate specializations among objects, e.g., an "animal" object type might be specialized as a "mammal" object type, which may further be specialized as a "cat" object type. Details about the properties of each object in the object hierarchy schema are discussed herein, but this figure is presented as an overview of the types of data objects contained in the object hierarchy schema presented herein.

The object hierarchy schema object set 30 of FIG. 2 includes a Resource object type 32, which represents a basic data object stored in the object hierarchy. The Resource object type 32 denotes an addressable object within the object hierarchy schema for providing a distinctly addressable location within an object hierarchy; i.e., for a particular address in the object hierarchy, only one object in the object hierarchy corresponds to the location. In some embodiments of the object hierarchy schema, the resource may be identified only by one address, while in other embodiments of the object hierarchy schema, the resource may be identified at a plurality of addresses. In any such embodiment, however, a single address in the object hierarchy may be associated with at most one object.

The Resource object type 32 of the object hierarchy schema object set 30 of FIG. 2 serves as a base object type for many other object types. Several of these object types correspond to objects that are sometimes devised as one or more files in conventional computing environment. As a first example, the object hierarchy schema object set 30 includes a Core Object object type 34, which is a specialized type of resource that comprises a set of objects located at the root of an object hierarchy. The object hierarchy schema object set 30 also includes an Application object type 36, which is a specialized type of resource that denotes an object representing an application installed in the computing environment. Many other objects may be associated with the Application object type, such as a title, an application icon, and one or more executable binaries. The object hierarchy schema object set 30 also includes a Data Entry object type 38, which is a specialized type of resource that represents a container of an atomic unit of data, such as an application binary, a document, a set of application configuration information, an image, etc. The object hierarchy schema object set 30 also includes an News Item object type 40, which is a specialized type of data entry object that denotes a noteworthy event in the computing environment.

The Resource object type may also serve as a base object type for other types of objects. As one example, the object hierarchy schema object set 30 also includes a Data Feed object type 42, which is a specialized type of resource that denotes a collection of related data entries, such as a set of songs (e.g., MP3 objects) comprising an album or a set of photo images comprising a photo album. The object hierarchy schema object set 30 also includes an Activity object type 44, which is a specialized type of resource that represents a event that has recently occurred in the computing environment, such as the creation of an object, a user login, and the addition of a device within the computing environment. (It may be appreciated that Activities represent less significant events arising in the ordinary course of a computing environment that may be of only transient interest to a user, such as copying a portion of text, while News Items represent more significant events that may be of longer-term interest to the user, such as the creation of a photo album.) The object hierarchy schema object set 30 also includes a Member object type 46, which is a specialized type of resource that denotes a relationship between a core object and a user that is related to the core object, e.g., through an ownership or permission set. The object hierarchy schema object set 30 also includes a Device object type 48, which is a specialized type of resource that represents a device to which at least a portion of the object hierarchy is authorized for transmission, and on which at least a portion of the represented computing environment is authorized for rendering. The object hierarchy schema object set 30 also includes a Mapping object type 50, which is a specialized type of resource that denotes a relationship between a device (i.e., a Device object) and a core object that may be delivered to the device. The object hierarchy schema object set 30 also includes a Profile object type 52, which is a specialized type of resource that represents a user profile of an authorized user of at least a portion of the computing environment. These object types are based on the Resource object type 32, and objects of these object types are included in an object hierarchy in an addressable and accessible manner similarly to more conventional object types, such as documents and images.

The object hierarchy schema object set 30 also includes object types that are not specialized from the Resource object type 32. These objects are included in the object hierarchy schema, but may not be included as addressable entities according to the addressing model of the object hierarchy schema 30. Rather, these objects may comprise accessible members of other objects, or specialized features of the object hierarchy schema that are encapsulated in objects that are outside of the addressing model of the object hierarchy schema 30. As one example, the object hierarchy schema object set 30 includes a Mesh object type 54, which includes information concerning an entire object hierarchy. Typically, a single Mesh object may be associated with a particular object hierarchy, but variations of this association may be included in other embodiments of the object hierarchy schema. The object hierarchy schema object set 30 also includes a Storage Service object type 56, which represents a storage device on which a portion of the object hierarchy (e.g., one or more core objects) are located. The object hierarchy schema 20 also includes a Resource Collection object type 58, which represents a collection of resources of a particular object type. For instance, a device object may be associated with one or more core object through one or more respective mapping objects, which may comprise a resource collection of mapping objects associated with the device. Similarly, the user profiles of the computing environment may be represented as a resource collection of profile objects associated with the mesh singleton object of the object hierarchy. The object hierarchy schema 20 also includes an Identity object type 60, which describes a particular user, e.g., the permissions accorded to the user in the computing environment. The object hierarchy schema 20 also includes a Role object type 62, which relates a member object with a core object according to a particular type of role (e.g., an owner, a reader, and a contributor.)

Figure 3:
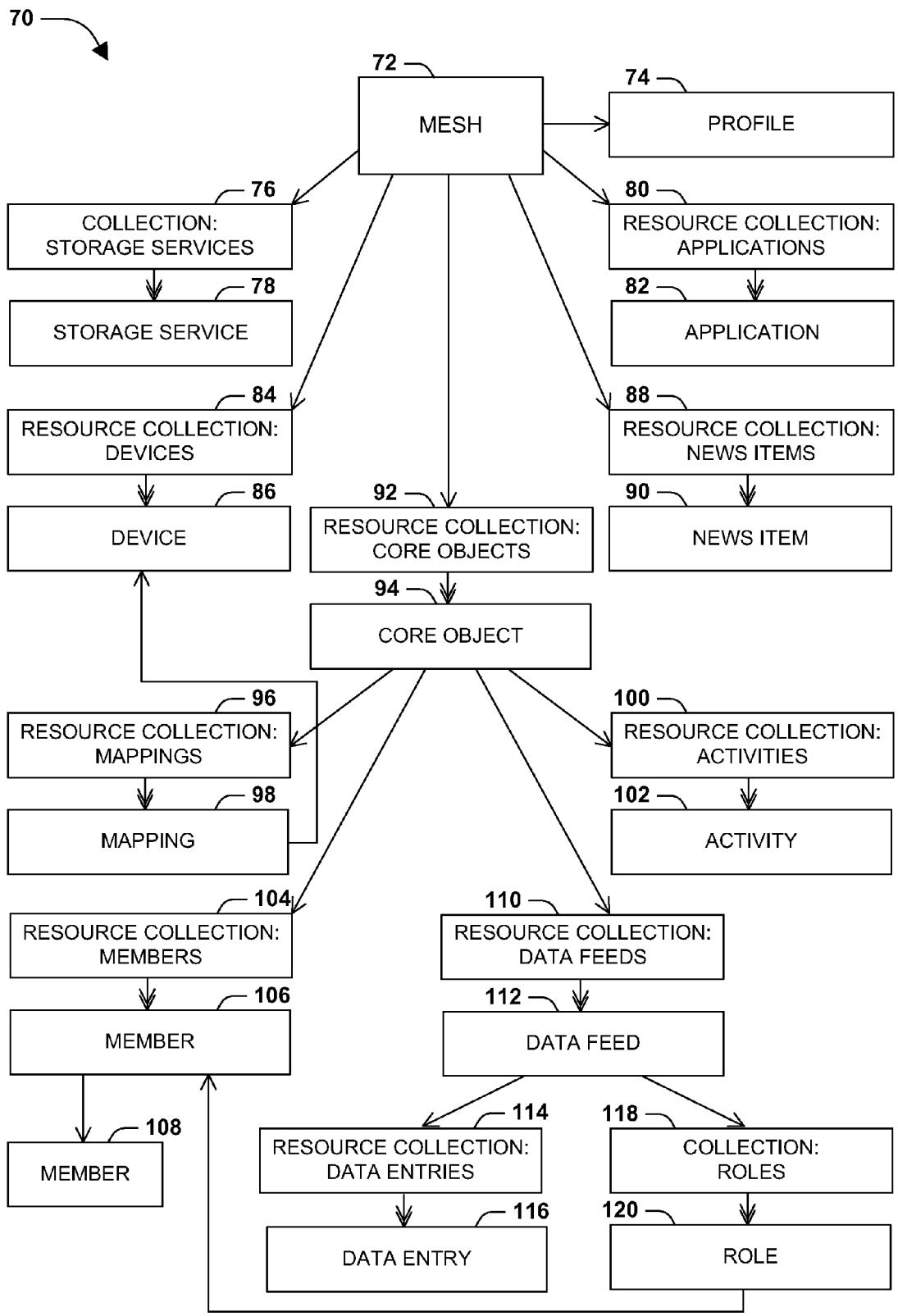
FIG. 3 is an illustration of an exemplary object hierarchy schema.

Together, the object types illustrated in FIG. 2 comprise a significant portion of the object hierarchy schema, and many objects of the computing environment may be represented according to these types of interrelated objects. In view of these object types and object hierarchies comprising objects of such object types, FIG. 3 illustrates the structure of the object hierarchy schema 70, wherein a single arrow from a first object to a second object indicates a relationship of the first object to the second object. Also, in FIG. 3, a double arrow from a first object to a second object indicates that the first object is a collection of one or more objects of the type indicated by the second object. For instance, the mesh object 72 is related to a devices collection 78 (as indicated by the single arrow), which contains a collection of device objects 80 (as indicated by the double arrow.) It may be appreciated that the object hierarchy schema object set 30 of FIG. 2 illustrates the specialization of object types (e.g., a first object is a specialized type of second object), whereas the object hierarchy schema 70 of FIG. 3 illustrates the organization of objects of these object types in an object hierarchy (e.g., a first object is related to one or more of the second object.)

FIG. 3 presents an exemplary object hierarchy schema 70 described herein, which comprises a mesh object 72, which, in this exemplary object hierarchy schema 70, comprises a singleton object that describes the computing environment. The mesh object 72 is related to six types of objects and object collections. First, the mesh object 72 is related to a profile object 74, which, in this exemplary object hierarchy schema 70, comprises a singleton object representing the profile of the current user. The mesh object 72 is also related to a storage services collection 76, which contains zero or more storage service objects 78 that represent different locations where portions of the object hierarchy may be stored. (It may be noted that neither the storage services collection 76 nor the storage service 78 is referred to as a "resource," since these objects are not based on the Resource object type 32.) The mesh object 72 is also related to an applications resource collection 80, which contains zero or more application resource objects 82 that represent applications available in the computing environment represented by the object hierarchy. The mesh object 72 is also related to a devices resource collection 76, which contains zero or more device resource objects 84 that represent devices on which at least a portion of the computing environment may be rendered. Finally, the mesh object 72 is also related to a core objects resource collection 92, which contains zero or more core resource objects 94 that comprise a set of objects located at the root of an object hierarchy.

As further illustrated in the exemplary object hierarchy schema 70 of FIG. 3, a core resource object 94 is related to four collections of objects. First, a core resource object 94 is related to a mappings resource collection 96, which contains at least zero mapping resource objects 98. Mapping resource objects 98 represent a relationship of the core resource object 94 with a device on which the core resource object 98 may be rendered; accordingly, respective mapping resource objects 98 are related to at least one device resource object 86. A core resource object 94 is also relate to an activities resource collection 100, which contains zero or more activity resource objects 102 that represent less significant events arising with respect to the core resource object 94, such as various alterations. A core resource object 94 is also related to a members resource collection 106, which contains one or more member resource objects 106 representing users that are afforded various levels of access to the core resource object 94. Respective member resource objects 106 are related to one or more identity objects 108, which provide additional information about the member represented by the member resource objects 106. Finally, a core resource object 94 is also related to a data feeds resource collection 110, which contains zero or more data feed resource objects 112 representing various collections of related data entries (e.g., collections of related user objects, such as songs in a music album.) A data feed resource object 112 is respectively related to a data entries resource collection 114 of data entry resource objects 116. A data feed resource object 112 is also related to a roles collection 118 of role objects 120 representing the access privileges extended to various users with respect to the data feed resource object 112; accordingly, the role objects 120 are related to one or more member resource objects 106 representing the users occupying such roles.

The exemplary object hierarchy schema 70 of FIG. 3 therefore presents an exemplary organization of the object types illustrated in FIG. 2 in such a manner as to represent the various and sundry data objects comprising a typical computer system. An object hierarchy (such as the exemplary object hierarchy 14 in the scenario 10 of FIG. 1) may be modeled after the exemplary object hierarchy schema 70, and may be hosted by a server (such as the computing environment host 12), which may apply a set of services to the objects of the object hierarchy 14 in order to alter and maintain the computing environment. The object hierarchy 14 may also be deployed to one or more devices (such as a cellphone device 16, a personal notebook computer 20, and a public workstation 24) that are configured to receive object hierarchies modeled after the exemplary object hierarchy schema 70 of FIG. 3, and may therefore render the computing environment represented thereby in a consistent manner.

Figure 4:
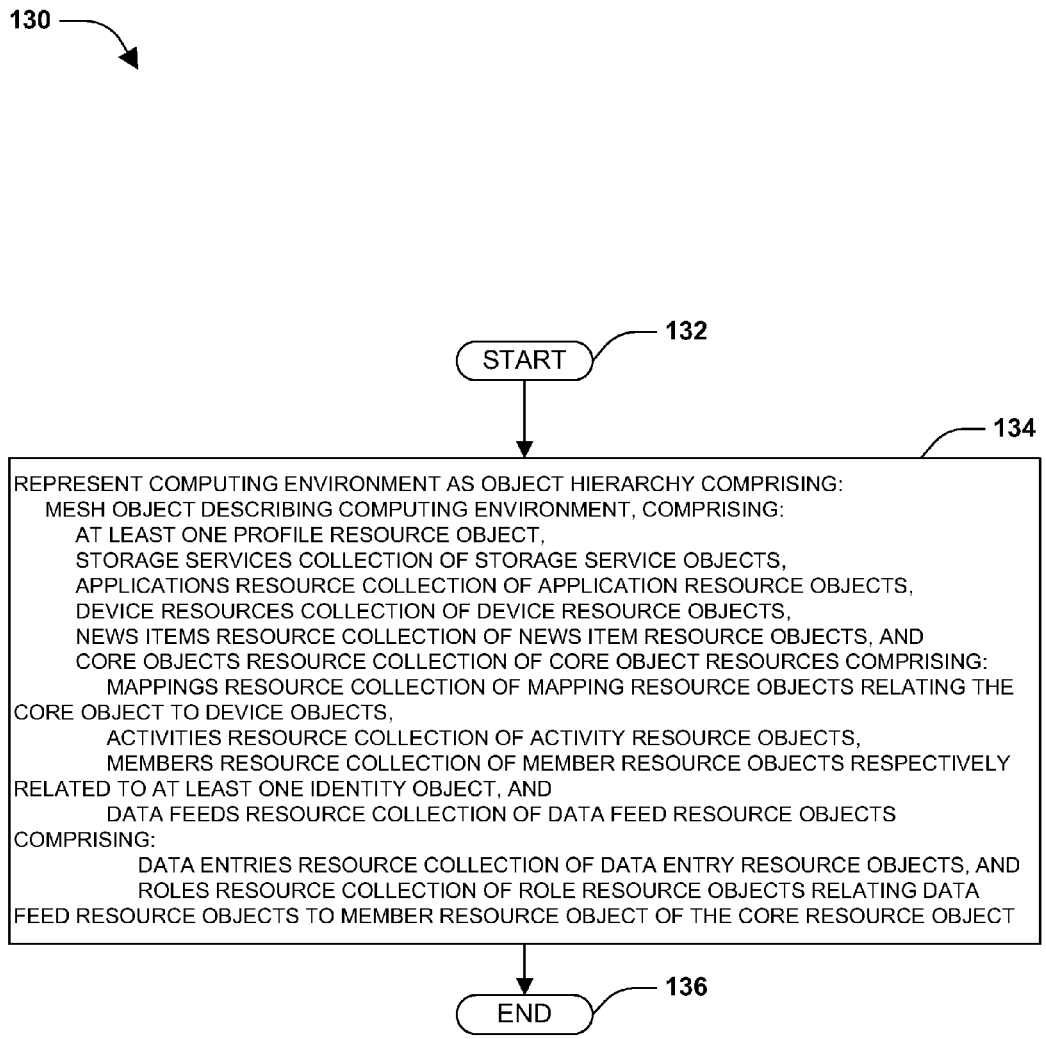
FIG. 4 is a flow diagram illustrating an exemplary method of representing a computing environment.

It may be appreciated that the formulation of an object hierarchy schema may be used to create an instance of an object hierarchy that represents a computing environment. Accordingly, FIG. 4 illustrated an exemplary method 130 of representing a computing environment, wherein the exemplary method 130 involves representing the computing environment as an object hierarchy organized according to an object hierarchy schema, such as the exemplary object hierarchy schema 70 of FIG. 3. The exemplary method 130 of FIG. 4 begins at 132 and involves representing 134 the computing environment as an object hierarchy comprising a mesh object describing the computing environment. The mesh object in turn comprises at least one profile resource object; a storage services collection of storage service objects; an applications resource collection of application resource objects; a device resources collection of device resource objects; a news items resource collection of news item resource objects; and a core objects resource collection of core resource objects. Respective core resource objects in turn comprise a mappings resource collection of mapping resource objects relating the core object to at least one device object; an activities resource collection of activity resource objects; a members resource collection of member resource objects relating the core object to at least one identity object; and a data feeds resource collection of data feed resource objects. Finally, respective data feed resource objects comprise a data entries resource collection of data entry resource objects, and a roles resource collection of role resource objects relating the data feed resource objects to a member resource object of the core resource object. By organizing and interrelating the objects of the object hierarchy in this manner, the exemplary method achieves the representation of the computing environment in a deployable manner, and so ends at 136.

Figure 5:
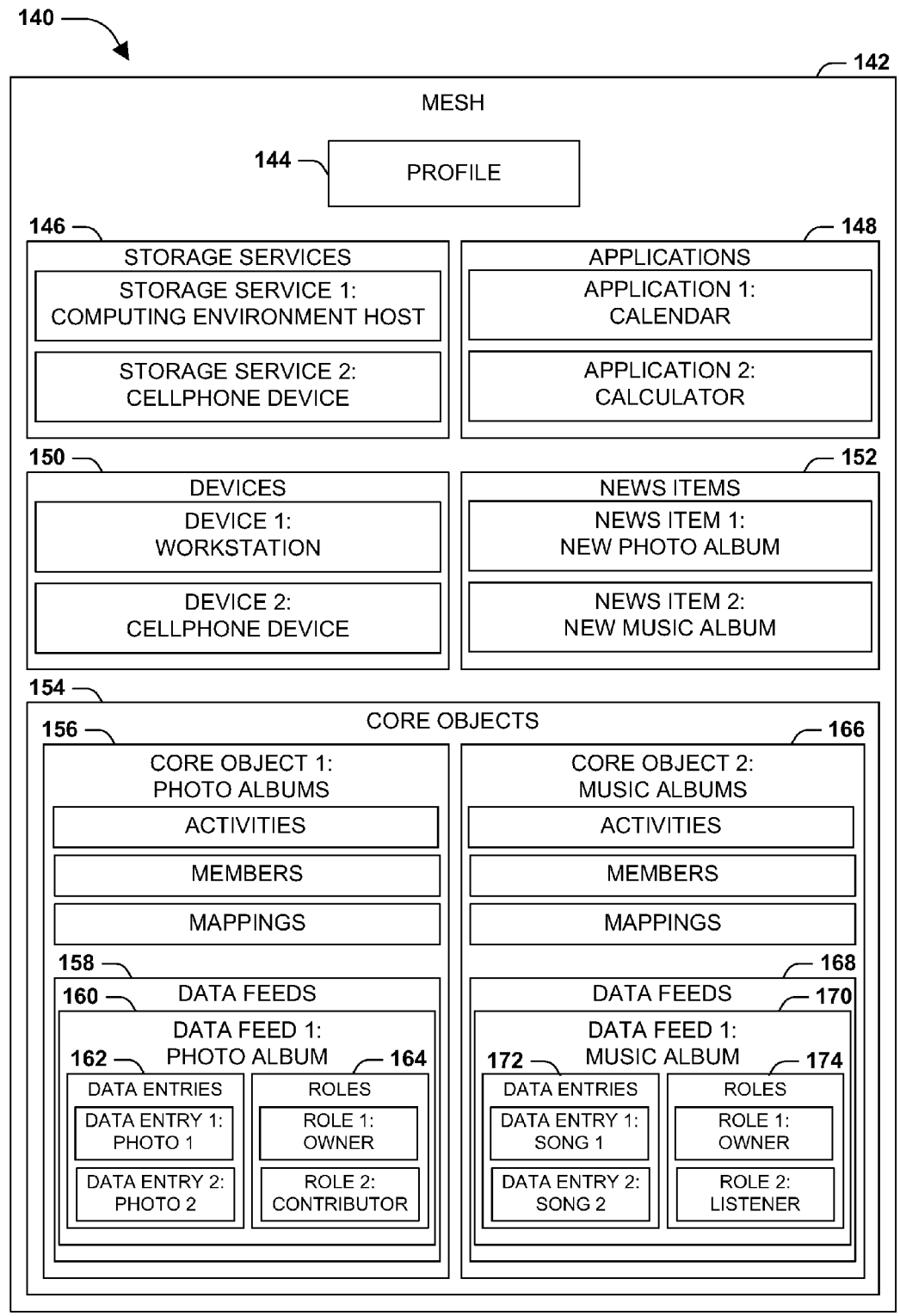
FIG. 5 is an illustration of an exemplary object hierarchy.

FIG. 5 illustrates an exemplary object hierarchy 140 based on the exemplary object hierarchy schema 70 of FIG. 3, and utilizing the object types illustrated in the object hierarchy schema object set 30 of FIG. 2. The exemplary object hierarchy 140 comprises a mesh object 142 that contains a profile resource object 144 representing the current user; a storage services collection 146 representing the storage services across which the exemplary object hierarchy 140 is stored (such as a computing environment host and a cellphone device); an applications resource collection 148 representing the set of applications available in the computing environment (such as a calendar application and a calculator application); a devices resource collection 150 representing the devices that together comprise the computing environment (such as a workstation computer system and a cellphone device); and a news items resource collection 152 describing noteworthy events arising in the computing environment (such as the creation of a new photo album and the addition of a music album.) The mesh object 142 also contains a core resource objects collection 154, which contains a first core resource object 156 representing a set of photo albums and a second core resource object 166 representing a set of music albums. The first core resource object 156 contains a activity resources collection representing less significant events arising with respect to the first core resource object 156, a members resource collection representing the members who are afforded various levels of access to the first core resource object 156, and a mappings collection relating the first core resource object 156 to the devices through which the first core resource object 156 may be accessed. The first core resource object 156 also contains a data feeds resource collection, comprising a data feed resource object 158 representing a photo album in the photo albums collection. The data feed resource object 158 in turn contains a data entries resource collection 162 comprising the photos of the photo album, and a roles resource collection 164 representing the various roles of members with respect to the photo album (an "owner" role occupied by a first member, and a "contributor" role occupied by a second member.) Similarly, the second core resource object 166 contains collections of activities, members, mappings, and data feeds, including a data feed resource object 170 representing a music album having a data entry resources collection 172 representing various songs on the music album, and a roles resource collection 174 representing members who may access the music album (including an "owner" role occupied by a first member and a "listener" role occupied by a second member.)

Object hierarchy schemas devised as discussed herein (such as the exemplary object hierarchy schema 70 of FIG. 3) may be implemented with variations in many aspects. Some variations may present additional advantages and/or reduce disadvantages with respect to other variations of these and other techniques. Such variations may be included, alone or in combination with other variations, in embodiments of these techniques (such as the exemplary method 130 of FIG. 4) in furtherance of such additional advantages and/or reduced disadvantages.

Figure 6:
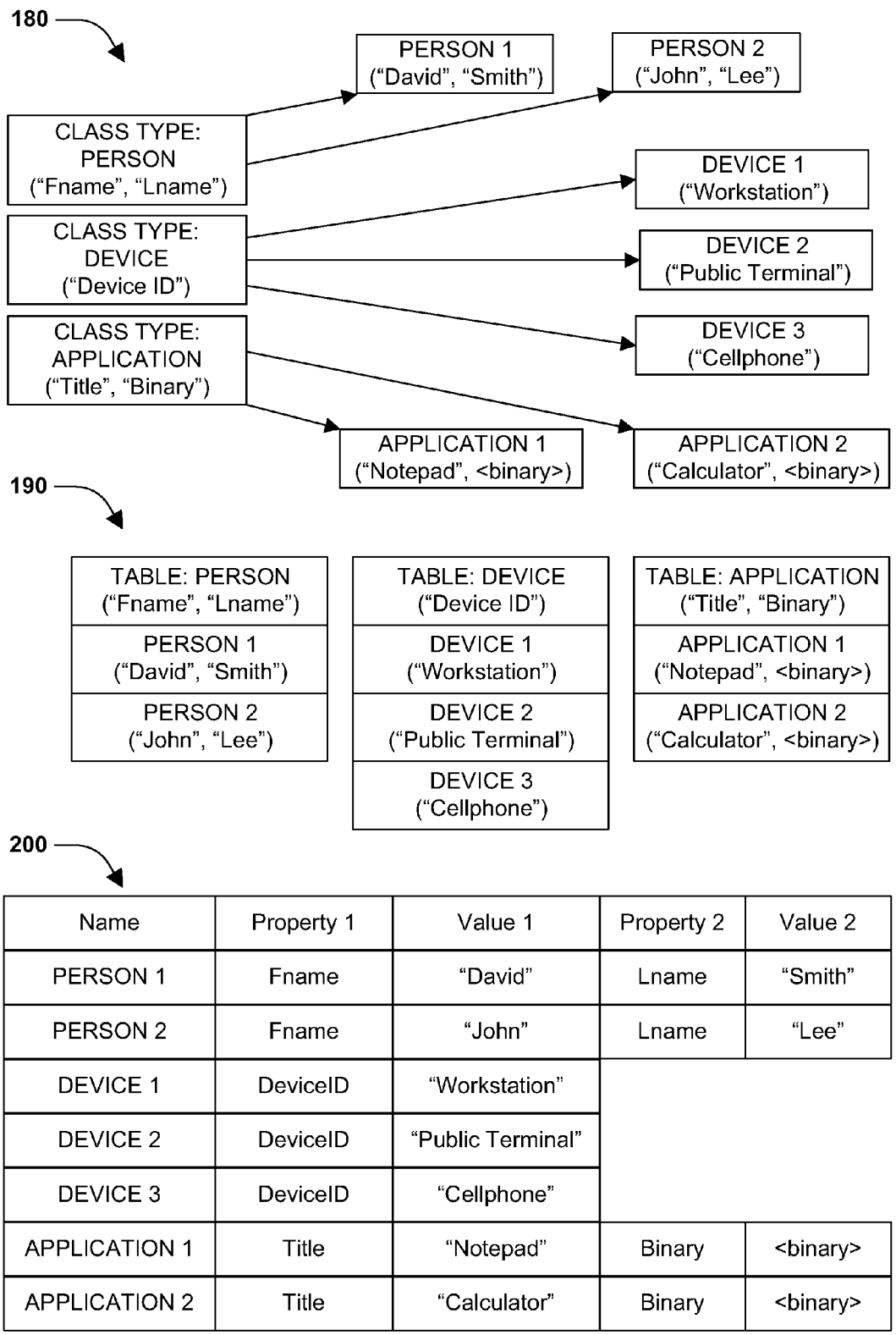
FIG. 6 is an illustration of three exemplary storage techniques for storing objects of an object hierarchy.

A second aspect that may vary among implementations of these techniques relates to the manner of storing the objects of an object hierarchy organized according to an object hierarchy schema. The object hierarchy schema described herein may be embodied in many models of object hierarchies. Some exemplary embodiments are illustrated in FIG. 6, each illustrating the storage of objects representing a person (having properties "Fname" and "Lname"), a device (having property "DeviceID"), and an application (having properties "Title" and "Binary," the latter comprising the contents of an executable binary.) As a first example 180, the object hierarchy schema may be manifested as a set of objects in an object-oriented language, such as C#, wherein objects are instantiated from classes, which are in turn defined as well-typed collections of named properties and methods. In this model, a set of classes may be defined, and objects may be instantiated from each class to represent an instance of the type of object modeled by the class. For instance, a class type may be defined for representing a person, and the class may be instantiated as a first class instance ("Person 1") representing a first person ("David Smith") and a second class instance ("Person 2") representing a second person ("John Lee"). As a second example 190, the object hierarchy schema may be manifested as a set of objects stored in a data store, such as a relational database. Each type of object may be stored in a particular relational table that is structured according to the properties of the object. For instance, a table may be structured to store representations of various persons, and may contain a first record ("Person 1") representing a first person ("David Smith") and a second record ("Person 2") representing a second person ("John Lee"). As a third example 200, the objects of the object hierarchy may be modeled after the objects of the object hierarchy schema, but may be stored in a structure-agnostic manner that provides a dictionary of property names and values. A tuple system may be utilized, wherein an object of any name may be declared as an arbitrary set of key/value tuples. For instance, representations of people may be stored as a first two-tuple ("Person 1") representing a first person ("David Smith") and a second two-tuple ("Person 2") representing a second person ("John Lee"). These and other embodiments of an object hierarchy schema may be devised by those of ordinary skill in the art while implementing the techniques discussed herein.

A second aspect that may vary among implementations of these techniques relates to the formulation of the object hierarchy schema in a manner that promotes extensibility of these object types and/or the addition of new object types. The object types illustrated in FIG. 2 may be fully adequate for representing many or all of the objects of a computing environment. However, the exemplary object hierarchy schema object set 30 illustrated in FIG. 2 is not presented as an exhaustive list of object types that may be defined and incorporated in the object hierarchy schema. Various embodiments of the object hierarchy schema may include and define other object types in addition to, specialized from, and/or as minor alterations of the object types illustrated in FIG. 2. Moreover, some embodiments of the object hierarchy schema may permit other types of objects to be stored in object hierarchies organized thereby. The object hierarchy schema may therefore be devised as an extensible object system, wherein objects may be created in the object hierarchy according to new object types, and object types may be extended with new properties. As a first example, completely new types of objects may be devised by various users and inserted into the object hierarchy. As a second example, a user may wish to associate metadata with objects in order to indicate objects having a semantic relationship. This metadata may supplement the objects of the object hierarchy with information of value to the user, and the object hierarchy schema may be devised in such a manner that the metadata does not interfere with the representation of the objects in an object hierarchy.

In furtherance of the extensibility of the object hierarchy schema, respective objects of the object hierarchy may be specified and stored according to a recursable base representation format, wherein the components of an object may be represented in a basic manner. For instance, it may be recognized that objects typically contain three types of data elements: atoms (single units of data, such as a number or a character), records (collections of single units of data operating together), and sequences (aggregations of elements.) A record generally denotes a set of elements that function together indivisibly as a representation, such as the numbers 7, 4, and 1776 together representing the date Jul. 4, 1776; whereas a sequence denotes a divisible set of items, such as 2, 3, 5, and 7 comprising a subset of the prime numbers. Moreover, the grammar may be devised with recursion, which may permit the nesting of certain kinds of elements (e.g., sequences of sequences, or a record containing a sequence as one element of the record.) By organizing objects in this manner, the object hierarchy schema may permit the representation of objects of known object types (such as those illustrated in FIG. 2) as well as the representation of objects of unknown object types, as and also the extension of known object types with new information, such as user-defined metadata. Those of ordinary skill in the art may be able to devise many extensible object hierarchy schemas and formats thereof while implementing the techniques discussed herein.

A third aspect that may vary among implementations of these techniques relates to the addressing model through which the objects of the object hierarchy may be identified. The addressing model may be advantageously selected to reflect the hierarchical arrangements of the objects comprising the object hierarchy (i.e., if a first object is hierarchically subordinate to a second object, the address for the first object is hierarchically subordinate to the address for the second object.) The addressing model may also be advantageously selected to designate at most one object for each address, and such that an object remains addressable at a particular address until and unless the object changes locations in the object hierarchy or is removed. In some embodiments of object hierarchy schemas, the addressing model may be devised such that respective objects are available at a single address, such that a first object available at a first address is de facto a different object as compared with a second object available at a second address. In other embodiments of object hierarchy schemas, an object may be accessible at two or more addresses. As one example, an object may have both a hierarchical address in an object hierarchy, and also a globally distinctive address through which the object may be distinctively identified regardless of its position in the object hierarchy. For instance, the objects of the object hierarchy may be assigned globally unique identifiers (GUIDs), and may be accessed either according to one or more hierarchical addresses in the object hierarchy or non-hierarchically according to its GUID. Thus, an object representing contact information for John Lee may be designated a GUID of 0xF451D3E0 upon creation, and may be accessible either through a hierarchical location and name (e.g., /Contacts/JohnLee) or through its GUID (e.g., /GUIDs/F451D3E0). Those of ordinary skill in the art may devise many addressing models for object hierarchy schemas while implementing the techniques discussed herein.

One such addressing model that may be advantageous involves a hierarchical addressing model that defines at most one object of a resource object type for respective addresses of an object hierarchy. This addressing model may be applied to an object hierarchy schema comprising object types such as illustrated in the exemplary object hierarchy schema object set 30 of FIG. 2, wherein many object types derive from a base Resource object type 32. Any such object derived therefrom may be ascribed a single, hierarchically oriented address in the object hierarchy; conversely, objects that do not derive from the Resource object type 32 may not be available through the addressing model. More particularly, the hierarchical addressing model may be defined according to a uniform resource identifier (URI) hierarchical addressing model. URIs are typically defined according to the following syntax:

scheme://authority/path/resource_name where the scheme represents a communications protocol (HTTP, FTP, telnet, etc.), the authority represents a server or data source, and the path represents a slash-delimited path to the node of a hierarchy where the named resource exists. The objects of an object hierarchy based on object hierarchy schemas (such as the exemplary object hierarchy schema 70 of FIG. 3) may be addressed in this manner, such as:

http://mycomputer.com/Contacts/JohnLee

This addressing model may be advantageous in several aspects. First, an object hierarchy that is addressable in this manner may be hosted by a common webserver, even if the webserver is not particularly configured to store objects of an object hierarchy representing a computing environment. Second, object accesses specified in this manner may be more easily handled by networking hardware (e.g., firewalls and routers) that are predominantly configured to handle URI-based requests. Third, an object hierarchy that is addressable in this manner may be represented according to a representational state transfer ("RESTful") interface, wherein the objects of the object hierarchy may be operated upon through a constrained set of well-defined operations; e.g., the common HTTP methods (PUT, GET, POST, and DELETE) may be wholly adequate for enabling the common verbs (Create, Read, Update, and Delete) for accessing the objects of an object hierarchy representing a computing environment. Other advantages may be provided and/or other disadvantages reduced as compared with other addressing models for various object hierarchy schemas.

A fourth aspect that may vary among implementations of these techniques relates to the components of the known object types defined in the object hierarchy schema. The exemplary object hierarchy schema object set 30 illustrated in FIG. 2 is presented as neither an exhaustive list of object types that may be defined and incorporated in the object hierarchy schema, nor as a complete set of properties comprising these object types. FIG. 7 illustrates an exemplary additional object properties set 210 comprising additional object properties that may be associated with object types of an object hierarchy schema. These additional object properties may be selected (alone or in combination with other additional object properties) to define further the objects of object hierarchies organized according to the object hierarchy schema, which may present additional advantages and/or reduce disadvantages with respect to object hierarchy schemas defining object types with different sets of object properties.

As illustrated in the exemplary additional object properties set 210, a Mesh object type 54 may be associated with additional properties including a self link object that specifies an address of the mesh (e.g., a partial URI defining the server or source of the mesh, such as http://mycomputer.com), and/or a title object that specifies a name for the object hierarchy and the computing environment represented thereby. Both a Resource object type 32 and a Resource Collection object type 58 may be associated with a large range of properties, including: an authors collection identifying the authors of the resource or resource collection; a base address object that specifies the base address (e.g., a base URI) for a resource or the items contained in a resource collection; a categories collection that specifies some user-defined categories that describe the resource or resource collection; a contributors collection that specifies contributors to the resource or resource collection; a copyright object that identifies a copyright statement with respect to the resource or resource collection; an identification object, such as a globally unique identifier (GUID); a links collection identifying links (e.g., URLs) related to the resource or resource collection; a self link object that specifies a distinctive address (e.g., a URI) of the resource or resource object; a summary object that contains a textual summary of the resource or resource collection; and/or a title object that specifies a name for the resource or resource collection.

As further illustrated in the exemplary additional object properties set 210, a Core Object type 34 may be associated with a user data object that contains an arbitrarily assigned set of user data (e.g., domain-specific metadata) associated with the core object. An Application object type 36 may be associated with an application identification object that distinctively identifies the application (e.g., an application name); a homepage location object that identifies a homepage (e.g., a website URL) for the application; an installed version location that identifies the current version of the application in the object hierarchy (e.g., Calculator version 1.2.1.1600); a manifest location object that identifies the location of the application manifest (e.g., a URI identifying a resource object in the object hierarchy, or a URL identifying a web-accessible application manifest); and/or a manifest version object that identifies the version of the application manifest available at the manifest location. A Data Entry object type 38 may be associated with a parent identification object that indicates a hierarchical parent of the data entry object; a synchronization object that contains object synchronization information (e.g., an up-to-date object synchronization indicator, the date and time when this data entry was last synchronized with a computing environment host, etc.), and/or a user data object that contains an arbitrarily assigned set of user data associated with the data entry. A Data Feed object type 42 may be associated with a synchronization entries collection comprising a set of synchronization-related activities or news items, and/or a data feed type object that indicates the type of data feed (e.g., a collection of images or sounds, the components of a multimedia document, etc.)

As further illustrated in the exemplary additional object properties set 210, an Activity object type 44 may be associated with an activity type object that describes the type of activity (e.g., data entry creation, reading, updating, or deletion), and/or a maximum age object that defines the maximum useful lifetime of the activity, beyond which the activity may represent an obsolete event that is no longer usefully stored and presented to users. A Member object type 46 may be associated with an invitation acceptance indicator object that indicates whether or not an individual invited to become a member of a resource or resource collection has accepted the invitation; an invitation expiration indicator object that indicates whether an invitation to become a member of a resource or resource collection has expired; an owner indicator object that indicates whether the member is an owner of the resource or resource collection; and/or a role type object that indicates the type of role occupied by the member with respect to the resource or resource collection (e.g., Author, Reader, etc.) A Device object type 48 may be associated with a device type object that describes the general class of devices to which the represented device belongs, and/or a device online indicator object that indicates whether or not the device is currently accessible to the device currently representing the computing environment. A Mapping object type 50 may be associated with a data feed mappings collection that identifies particular data feeds in a core resource object that are mapped to a device. For instance, a device may be mapped to a subset of a core object through an object of the Mapping object type 50, but the mapping may be limited to certain data feeds identified in the data feed mappings collection of the mapping object. A Profile object type 52 may be associated with a name object that represents the name of the user, and/or an email address object that represents an email address contact for the user. Finally, a Role object type 62 may be associated with a creation permission indicator object, a deletion permission indicator object, a read permission indicator object, and/or an update permission indicator object that identify the permissions associated with the role, and/or a role type object that identifies the role type occupied by the user in this role.

The exemplary additional object properties 210 of FIG. 7 therefore illustrates some object properties that may be further associated (alone or in combination) with various object types of an object hierarchy schema. However, it may be appreciated that the additional object properties set 210 is not presented as an exhaustive list of object properties that may be associated with various object types of such object hierarchy schemas, and that many other object properties may be alternatively or additionally associated with various object types. Those of ordinary skill in the art may be able to include many additional or alternative object properties in the definition of various known object types of an object hierarchy schema while implementing the techniques discussed herein.

Figure 8:
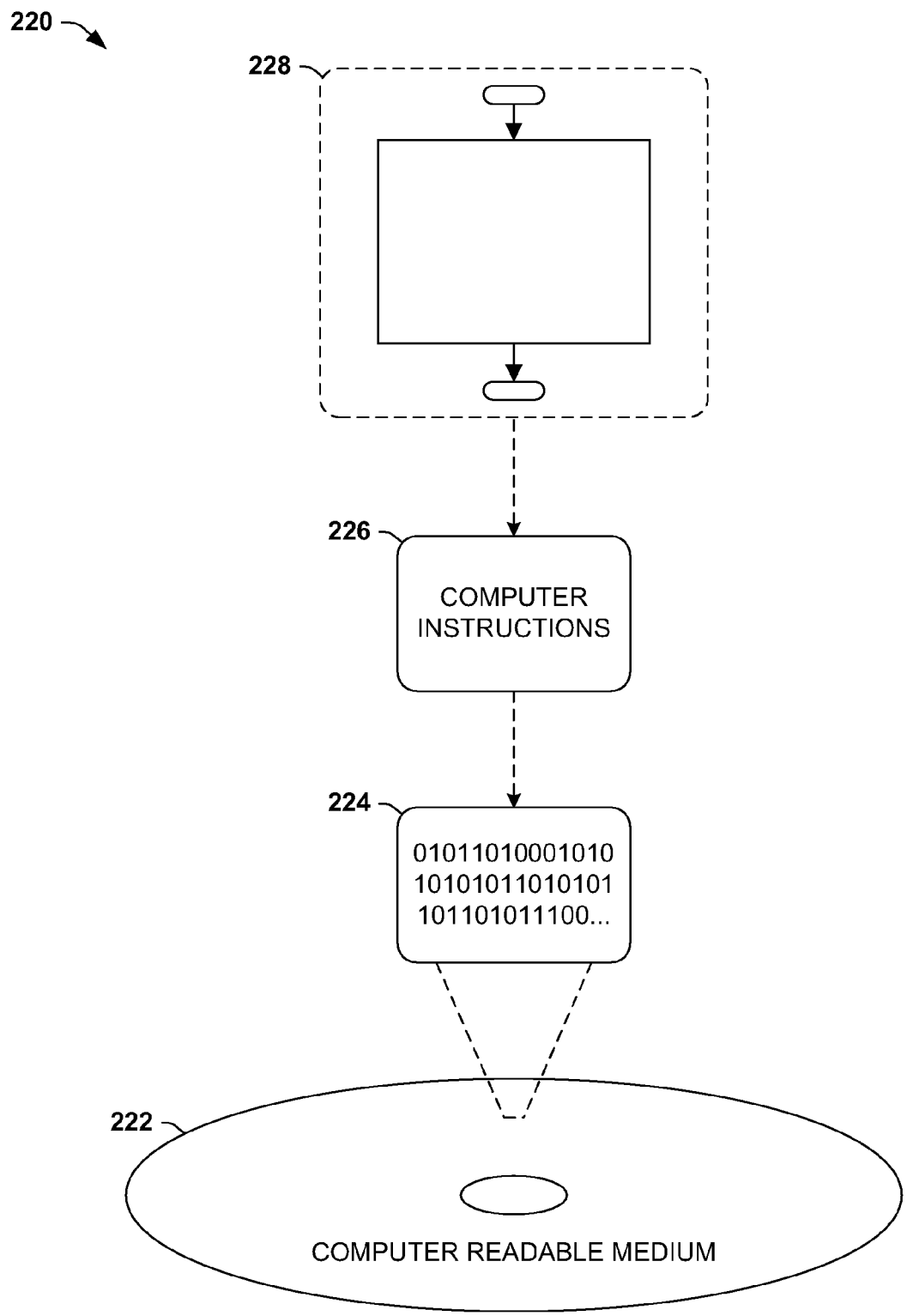
FIG. 8 is an illustration of an exemplary computer-readable medium comprising processor-executable instructions configured to embody one or more of the provisions set forth herein.

Another embodiment of the techniques discussed herein involves a computer-readable medium comprising processor-executable instructions configured to perform a method of representing a computing environment according to an object hierarchy. An exemplary computer-readable medium that may be devised in these ways is illustrated in FIG. 8, wherein the implementation 220 comprises a computer-readable medium 222 (e.g., a CD-R, DVD-R, or a platter of a hard disk drive), on which is encoded computer-readable data 224. This computer-readable data 224 in turn comprises a set of computer instructions 226 configured to operate according to the principles set forth herein. In one such embodiment 220, the processor-executable instructions 226 may be configured to perform a method of representing a computing environment according to an object hierarchy, such as the exemplary method 130 of FIG. 4. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
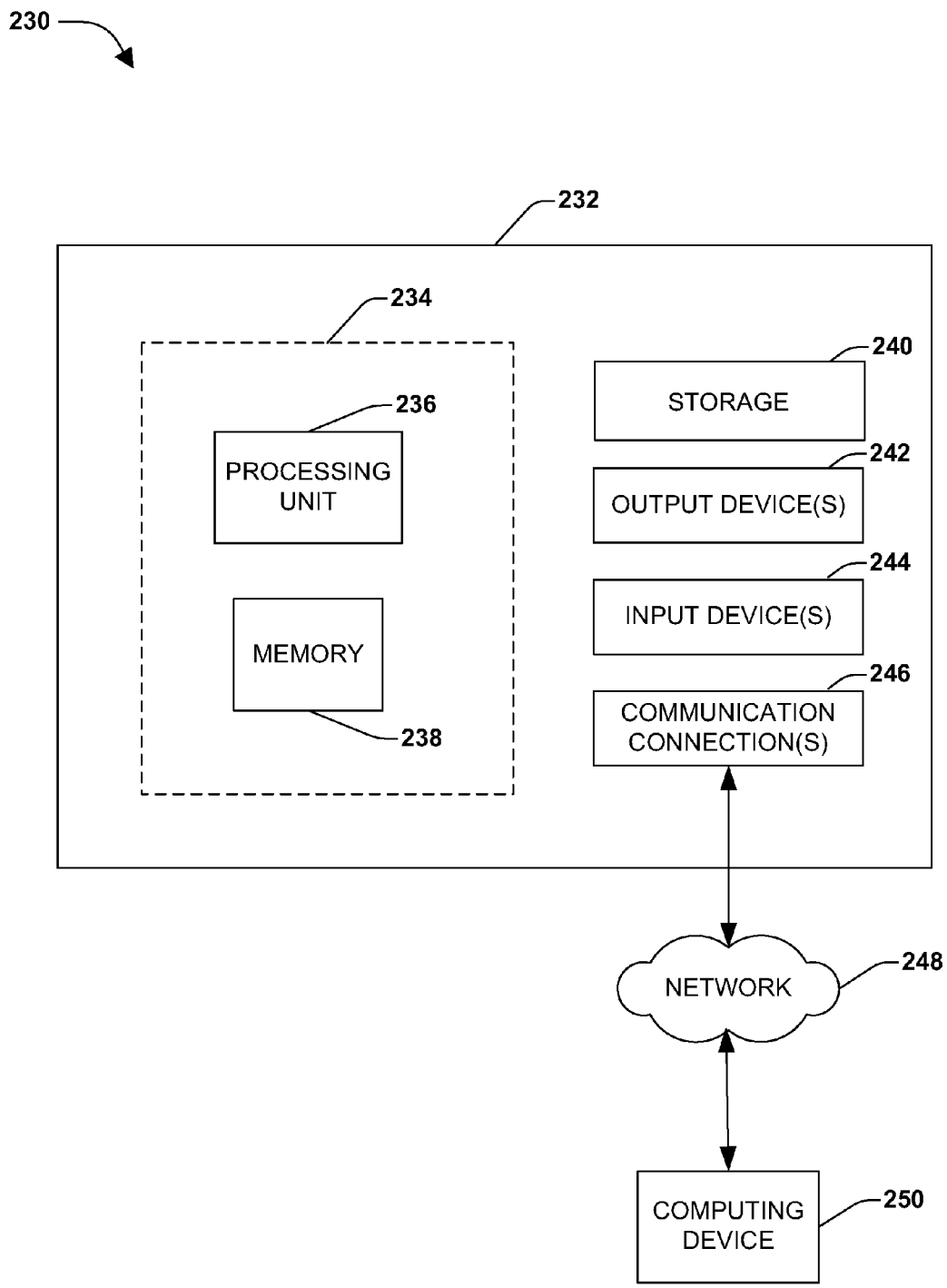
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Embodiments may be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 230 comprising a computing device 232 configured to implement one or more embodiments provided herein. In one configuration, computing device 232 includes at least one processing unit 236 and memory 238. Depending on the exact configuration and type of computing device, memory 238 may be volatile (such as RAM, for example), non-volatile (such as ROM, flash memory, etc., for example) or some combination of the two. This configuration is illustrated in FIG. 9 by dashed line 234.

In other embodiments, device 232 may include additional features and/or functionality. For example, device 232 may also include additional storage (e.g., removable and/or non-removable) including, but not limited to, magnetic storage, optical storage, and the like. Such additional storage is illustrated in FIG. 9 by storage 240. In one embodiment, computer readable instructions to implement one or more embodiments provided herein may be in storage 240. Storage 240 may also store other computer readable instructions to implement an operating system, an application program, and the like. Computer readable instructions may be loaded in memory 238 for execution by processing unit 236, for example.

The term "computer readable media" as used herein includes computer storage media. Computer storage media includes volatile and nonvolatile, removable and non-removable media implemented in any method or technology for storage of information such as computer readable instructions or other data. Memory 238 and storage 240 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 232. Any such computer storage media may be part of device 232.

Device 232 may also include communication connection(s) 246 that allows device 232 to communicate with other devices. Communication connection(s) 246 may include, but is not limited to, a modem, a Network Interface Card (NIC), an integrated network interface, a radio frequency transmitter/receiver, an infrared port, a USB connection, or other interfaces for connecting computing device 232 to other computing devices. Communication connection(s) 246 may include a wired connection or a wireless connection. Communication connection(s) 246 may transmit and/or receive communication media.

Device 232 may include input device(s) 244 such as keyboard, mouse, pen, voice input device, touch input device, infrared cameras, video input devices, and/or any other input device. Output device(s) 242 such as one or more displays, speakers, printers, and/or any other output device may also be included in device 232. Input device(s) 244 and output device(s) 242 may be connected to device 232 via a wired connection, wireless connection, or any combination thereof. In one embodiment, an input device or an output device from another computing device may be used as input device(s) 244 or output device(s) 242 for computing device 232.

Components of computing device 232 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 232 may be interconnected by a network. For example, memory 238 may be comprised of multiple physical memory units located in different physical locations interconnected by a network.

Those skilled in the art will realize that storage devices utilized to store computer readable instructions may be distributed across a network. For example, a computing device 250 accessible via network 248 may store computer readable instructions to implement one or more embodiments provided herein. Computing device 232 may access computing device 250 and download a part or all of the computer readable instructions for execution. Alternatively, computing device 232 may download pieces of the computer readable instructions, as needed, or some instructions may be executed at computing device 232 and some at computing device 250.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described are not to be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of representing a computing environment on a device having a processor, the method comprising:
executing on the processor instructions configured to:
generate an object hierarchy representing the computing environment, the object hierarchy having a uniform resource identifier hierarchical addressing model that defines at most one object of a resource object type for respective addresses of an object hierarchy according to a representational state transfer interface and comprising:
a mesh object describing the computing environment, the mesh object comprising:
at least one profile resource object, and
a storage services collection of storage service objects,
an applications resource collection of application resource objects,
a devices resource collection of device resource objects,
a news items resource collection of news item resource objects, and
a core objects resource collection of core resource objects, respective core resource objects comprising:
a mappings resource collection of mapping resource objects, respective mapping resource objects related to at least one device object;
an activities resource collection of activity resource objects;
a members resource collection of member resource objects, respective member resource objects related to at least one identity object; and
a data feeds resource collection of data feed resource objects, respective data feed resource objects comprising:
a data entries resource collection of data entry resource objects, and
a roles resource collection of role resource objects relating the data feed resource objects to a member resource object of the core resource object,
the profile resource object, application resource objects, device resource objects, news item resource objects, core resource objects, mapping resource objects, activity resource objects, member resource objects, data feed resource objects, data entry resource objects, and role resource objects based on a resource object type comprising:
an authors collection,
a base address object,
a categories collection,
a contributors collection,
a copyright object,
an identification object,
a links collection,
a self link object,
a summary object, and
a title object;
upon receiving a request to render the computing environment on the device, render the computing environment using the object hierarchy; and
upon receiving a request to alter the computing environment, alter at least one object of the object hierarchy.

2. The method of claim 1, the core resource objects based on a core resource object type comprising a user data object.

3. The method of claim 1, the application resource objects based on an
application resource object type comprising: an application identification object, a homepage location object, an installed version object, a manifest location object, and a manifest version object.

4. The method of claim 1, the data entry resource objects and news item
resource objects based on a data entry resource object type comprising: a parent identification object, a synchronization object, and a user data object.

5. The method of claim 1, the data feed resource objects based on a data feed resource object type comprising:
a synchronization entries collection of synchronization-related data entry resource objects, and
a data feed type object.

6. The method of claim 1, the member resource objects based on a member resource object type comprising:
an invitation acceptance indicator object, an invitation expiration indicator object, an owner indicator object, and a role type object.

7. The method of claim 1, the device resource objects based on a device
resource object type comprising: a device type object, and a device online indicator object.

8. The method of claim 1, the mapping resource objects based on a resource object type comprising a data feed resource objects collection.

9. The method of claim 1, the role objects based on a role object type comprising:
a creation permission indicator object,
a deletion permission indicator object,
a read permission indicator object,
an update permission indicator object, and
a role type object.

10. The method of claim 1, the object hierarchy configured to represent objects according to a recursable base representation format.

11. The method of claim 10, the recursable base representation format comprising a recursable sequence of records of atoms.

12. A computer-readable storage device storing processor-executable instructions that, when executed on a processor of a device, represent a computing environment of the device by:
generating an object hierarchy representing the computing environment, the object hierarchy having a uniform resource identifier hierarchical addressing model that defines at most one object of a resource object type for respective addresses of an object hierarchy according to a representational state transfer interface and comprising:
a mesh object describing the computing environment, the mesh object comprising:
at least one profile resource object, and
a storage services collection of storage service objects,
an applications resource collection of application resource objects,
a devices resource collection of device resource objects, a news items resource collection of news item
resource objects, and
a core objects resource collection of core resource
objects, respective core resource objects comprising:
a mappings resource collection of mapping
resource objects, respective mapping resource
objects related to at least one device object;
an activities resource collection of activity resource
objects;
a members resource collection of member resource
objects, respective member resource objects
related to at least one identity object; and
a data feeds resource collection of data feed
resource objects, respective data feed resource
objects comprising:
a data entries resource collection of data entry
resource objects, and
a roles resource collection of role resource
objects relating the data feed resource objects to
a member resource object of the core resource
object;
upon receiving a request to render the computing environment on the device, rendering the computing environment
using the object hierarchy,
the profile resource object, application resource objects,
device resource objects, news item resource objects, core
resource objects, mapping resource objects, activity resource
objects, member resource objects, data feed resource objects,
data entry resource objects, and role resource objects based
on a resource object type comprising:
an authors collection,
a base address object,
a categories collection,
a contributors collection,
a copyright object,
an identification object,
a links collection,
a self link object,
a summary object, and
a title object; and
upon receiving a request to alter the computing environment, altering at least one object of the object hierarchy.

13. A method of representing a computing environment on
a device having a processor, the method comprising:
executing on the processor instructions configured to:
generate an object hierarchy representing the computing
environment according to a representational state
transfer interface, the object hierarchy represented
according to a recursable base representation format
comprising a recursable sequence of records of atoms
and comprising:
a mesh object describing the computing environment,
the mesh object comprising:
a self link object,
a title object,
at least one profile resource object comprising:
a name object, and
an email address object;
a storage services collection of storage service
objects,
an applications resource collection of application
resource objects, respective application resource
objects comprising:
an application identification object,
a homepage location object,
an installed version object,
a manifest location object, and
a manifest version object;
a devices resource collection of device resource
objects, respective device resource objects comprising:
a device type object, and
a device online indicator object;
a news items resource collection of news item
resource objects, and
a core objects resource collection of core resource
objects, respective core resource objects comprising:
a user data object;
a mappings resource collection of mapping
resource objects, respective mapping resource
objects related to at least one device object and
comprising a data feed resource objects collection;
an activities resource collection of activity
resource objects, respective activity resource
objects comprising:
an activity type object, and
a maximum age object;
a members resource collection of member
resource objects, respective member resource
objects related to at least one identity object and
comprising:
an invitation acceptance indicator object,
an invitation expiration indicator object,
an owner indicator object, and
a role type object; and
a data feeds resource collection of data feed
resource objects, respective data feed resource
objects comprising:
a synchronization entries collection of synchronization-related data entry resource objects,
a data feed type object,
a data entries resource collection of data entry
resource objects, respective data entry resource
objects comprising:
a parent identification object,
a synchronization object, and
a user data object; and
a roles resource collection of role resource
objects relating the data feed resource objects to
a member resource object of the core resource
object, respective role resource objects comprising:
a creation permission indicator object,
a deletion permission indicator object,
a read permission indicator object,
an update permission indicator object, and
a role type object;
the profile resource object, application resource objects,
device resource objects, news item resource objects, core
resource objects, mapping resource objects, activity resource
objects, member resource objects, data feed resource objects,
data entry resource objects, and role resource objects based
on a resource object type comprising:
an authors collection,
a base address object,
a categories collection,
a contributors collection,
a copyright object,
an identification object,
a links collection,
a self link object, a summary object, and
a title object;
the applications resource collection, devices resource collection, news items resource collection, core objects resource collection, mappings resource collections, activities resource collections, members resource collections, data feeds resource collections, data entries resource collections, and roles resource collections based on a resource collections object type comprising:
   an authors collection,
   a base location object,
   a categories collection,
   a contributors collection,
   a copyright object,
   an identification object,
   a links collection,
   a self link object,
   a summary object, and
   a title object; and
the object hierarchy schema comprising a uniform resource identifier hierarchical addressing model that defines at most one object of a resource object type for respective addresses of an object hierarchy;
   upon receiving a request to render the computing environment on the device, render the computing environment using the object hierarchy; and
   upon receiving a request to alter the computing environment, alter at least one object of the object hierarchy.

14. The method of claim 1:
rendering the computing environment on the device comprising: upon receiving from the device an HTTP GET request specifying at least one object of the object hierarchy, send the at least one object of the object hierarchy to the device within an HTTP reply to the HTTP GET request; and
altering the computing environment comprising:
   upon receiving from the device an HTTP PUT request including at least one object, store the object in the object hierarchy;
   upon receiving from the device an HTTP POST request specifying an update of at least one object of the object hierarchy, apply the update to the at least one object of the object hierarchy; and
   upon receiving from the device an HTTP DELETE request specifying at least one object of the object hierarchy, remove the at least one object from the object hierarchy.

15. The method of claim 1, rendering the computing environment for a device comprising: sending to the device at least one object of the object hierarchy.

16. The method of claim 15, rendering the computing environment for a device comprising: rendering the computing environment customized based on at least one capability of the device.

* * * * *

UNITED STATES PATENT AND TRADEMARK OFFICE
CERTIFICATE OF CORRECTION

| | |
|---|---|
| PATENT NO. | : 8,484,174 B2 |
| APPLICATION NO. | : 12/052554 |
| DATED | : July 9, 2013 |
| INVENTOR(S) | : Shukla et al. |

It is certified that error appears in the above-identified patent and that said Letters Patent is hereby corrected as shown below:

In the Specification

In column 5, line 49, delete "therebetween." and insert -- there- between. --, therefor.

In column 6, line 62, delete "therebetween." and insert -- there- between. --, therefor.

Signed and Sealed this
Third Day of February, 2015

Michelle K. Lee
*Deputy Director of the United States Patent and Trademark Office*